(12) United States Patent
Inaba et al.

(10) Patent No.: US 7,469,934 B2
(45) Date of Patent: Dec. 30, 2008

(54) PIPE JOINT STRUCTURE AND METHOD FOR FABRICATING THE SAME

(75) Inventors: Atsushi Inaba, Kariya (JP); Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 838 days.

(21) Appl. No.: 10/610,007

(22) Filed: Jun. 30, 2003

(65) Prior Publication Data
US 2004/0036277 A1  Feb. 26, 2004

(30) Foreign Application Priority Data
Jul. 1, 2002 (JP) .............................. 2002-192203

(51) Int. Cl.
*F16L 39/00* (2006.01)
*F16L 19/04* (2006.01)

(52) U.S. Cl. .............. 285/124.3; 285/124.4; 285/124.5; 285/137.11; 285/382; 285/382.5

(58) Field of Classification Search ... 285/124.1–124.5, 285/137.11, 382, 382.4, 382.5
See application file for complete search history.

(56) References Cited

U.S. PATENT DOCUMENTS

| | | | |
|---|---|---|---|
| 3,787,945 A * | 1/1974 | Pasek et al. ............. | 29/890.044 |
| 4,142,843 A | 3/1979 | Kish | |
| 4,468,054 A * | 8/1984 | Orth ........................ | 285/124.3 |
| 5,294,156 A | 3/1994 | Kumazaki et al. | |
| 5,556,138 A * | 9/1996 | Nakajima et al. ........ | 285/124.4 |
| 5,593,279 A | 1/1997 | Hayashi | |
| 5,596,881 A | 1/1997 | Wilson et al. | |
| 5,633,094 A * | 5/1997 | Takeshima et al. ......... | 428/679 |
| 5,769,465 A * | 6/1998 | Schultz et al. ............. | 285/328 |
| 5,833,278 A * | 11/1998 | Rianda et al. ............ | 285/124.1 |
| 6,206,437 B1 * | 3/2001 | Humphreys ................. | 285/353 |
| 6,328,351 B1 * | 12/2001 | Kato et al. .................. | 285/368 |
| 6,527,302 B1 * | 3/2003 | Gault et al. .............. | 285/125.1 |

FOREIGN PATENT DOCUMENTS

| | | |
|---|---|---|
| JP | 59-37392 | 2/1984 |
| JP | 63-40693 | 3/1988 |
| JP | 63-233270 | 9/1988 |
| JP | 7-012283 | 1/1995 |
| JP | 7-12690 | 3/1995 |
| JP | 08-216668 | 8/1996 |
| JP | 2001-248773 | 9/2001 |
| JP | 2002-130561 | 5/2002 |

OTHER PUBLICATIONS

French Search Report dated Oct. 15, 2004 in French Application No. 0307936.

* cited by examiner

*Primary Examiner*—James M Hewitt
*Assistant Examiner*—Jay R Ripley
(74) *Attorney, Agent, or Firm*—Harness, Dickey & Pierce, PLC

(57) ABSTRACT

A pipe joint structure capable of reducing the joint height (H) and fabrication costs has a connection flange member provided with a through hole piercing the thickness of the flange member. A polygonal enlarged recess greater than the inner diameter of the through hole is formed at one end of the through hole. Meanwhile, an annular protrusion protruding radially outward is formed near an end of a pipe having an outer diameter capable of insertion into the through hole. This annular protrusion has an outer diameter greater than the incircle diameter of the polygonal enlarged recess. The annular protrusion is press-fitted and fixed to the polygonal enlarged recess.

5 Claims, 10 Drawing Sheets

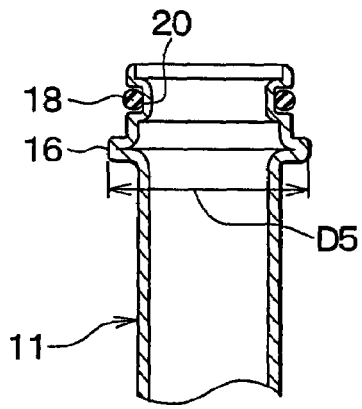
FIG. 4
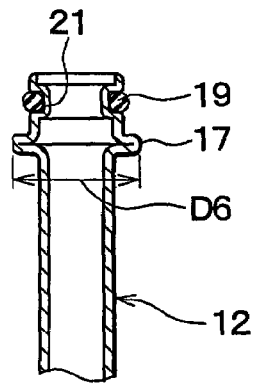
FIG. 5
FIG. 6
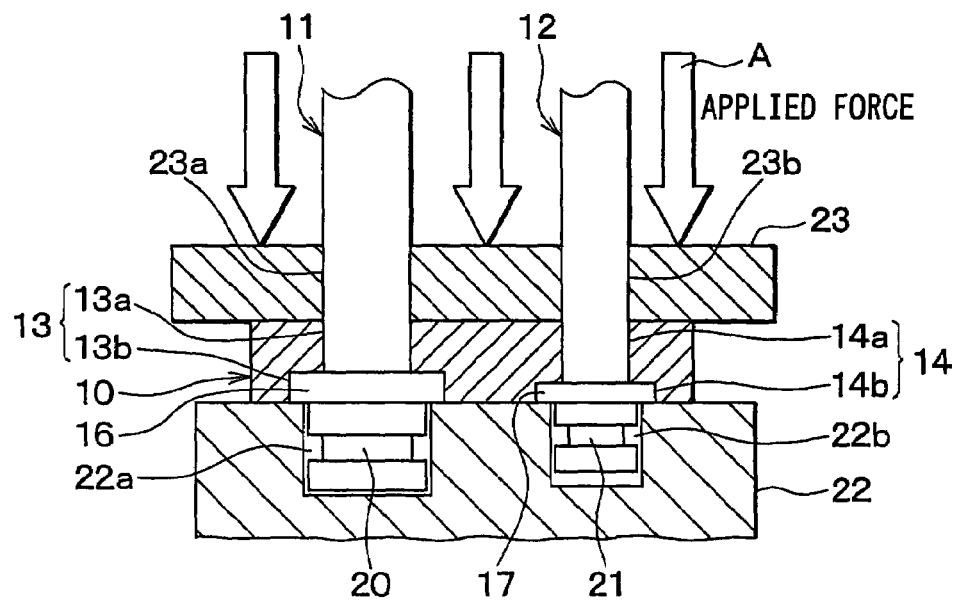

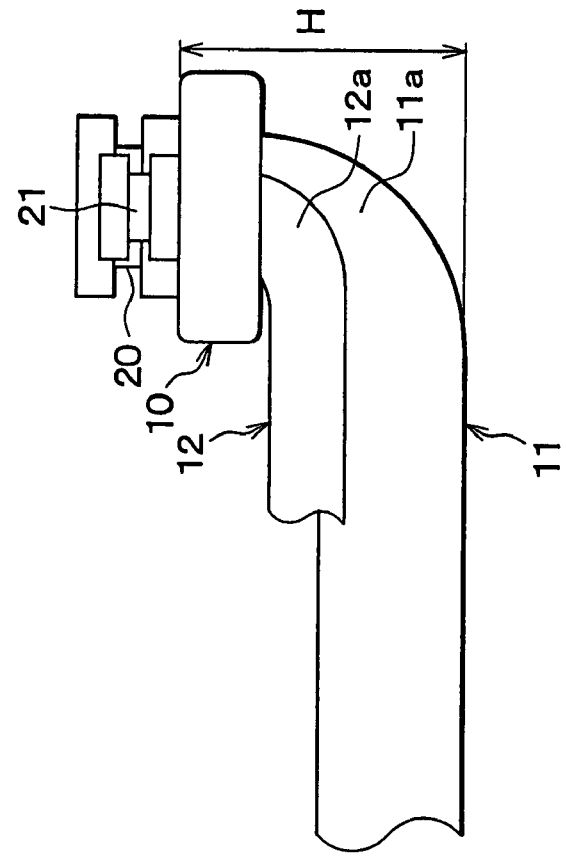
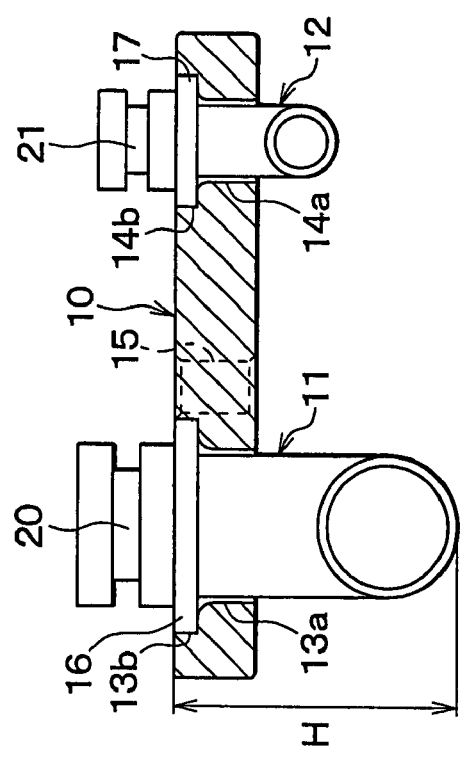
FIG. 11A
FIG. 11B

PIPE JOINT STRUCTURE AND METHOD FOR FABRICATING THE SAME

CROSS REFERENCE TO RELATED APPLICATION

This application is based upon, claims the benefit of priority of, and incorporates by reference, the contents of Japanese Patent Application No. 2002-192203 filed Jul. 1, 2002.

BACKGROUND OF THE INVENTION

1. Field of the Invention

The present invention relates to a pipe joint structure and a method for fabricating the same in which a pipe is provided with an annular protrusion protruding radially outward, and this annular protrusion and a through hole part in a connection flange member are press-fitted and fixed to each other. The invention is suitably applicable to a refrigerant pipe joint of a vehicle air conditioning refrigeration system, for example.

2. Description of the Related Art

FIG. 22 shows a conventional pipe joint structure disclosed in Japanese Patent Laid-Open Publication No. Hei 4-266521. In this conventional art, an annular protrusion 16 protruding radially outward is formed near an end of a pipe 11 by bulging. Two split flange members 10A and 10B split along the axial direction of the pipe 11 are also provided. The two split flange members 10A and 10B are coupled with each other by fitting arcuate recesses 10C and 10D of the two split flange members 10A and 10B to the pipe 11, and sliding either one of the split flange members, 10B, with respect to the other split flange member 10A along the axial direction of the pipe 11 as shown by the arrow J.

Two split flange members 10A, 10B are moved toward the end of the pipe 11 until enlarged recesses 10E, 10F formed in the end side of the two split flange members 10A, 10B, respectively, come into contact with the annular protrusion 16 of the pipe 11. In this state, the two split flange members 10A, 10B are fastened by screws (not-shown) so that the pipe 11 and the two split flange members 10A, 10B are fixed to each other.

In the conventional art described above, the one split flange member 10B needs to be slid with respect to the other split flange member 10A along the axial direction of the pipe 11 as shown by the arrow J, so that the pipe 11 requires a straight part K to facilitate sliding. This results in the problem of an inevitable increase in the height H of the pipe joint. In applications of extremely tight mounting spaces, such as a vehicle, the increased height H can sometimes prevent the adoption of the foregoing conventional art.

Therefore, a pipe joint comprising an aluminum block member has been put to practical use. Here, the block member is cut to have a pipe connecting part having an annular concave groove for accommodating an O-ring, a passage hole communicating with the pipe connecting part, and so on. A pipe end is inserted into the passage hole and brazed, whereby the height H of the pipe joint is reduced. Nevertheless, this conventional art requires laborious cutting, and additionally requires brazing aside from the cutting. There has thus been the problem of a significant increase in fabrication costs.

SUMMARY OF THE INVENTION

In view of the foregoing problems, it is an object of the present invention to provide a pipe joint structure and a method for fabricating the pipe joint structure which eliminates the need for the straight part in the direction of the pipe axis which is utilized for sliding, reduces the joint height, and suppresses the fabrication cost.

To achieve the foregoing object, according to a first aspect of the invention, a pipe joint structure has a connection flange member (10) having a through hole (13, 14) in its thickness, an enlarged recess (13b, 14b) greater than an inner diameter of the through hole (13, 14) is formed at one end of the through hole (13, 14), and a pipe (11, 12) having an outer diameter capable of being inserted into the through hole (13, 14). Additionally, an annular protrusion (16, 17) protrudes radially outward and is formed near an end of the pipe (11, 12). The annular protrusion (16, 17) is press-fitted and fixed to the enlarged recess (13b, 14b).

Consequently, the pipe (11, 12) can be held and fixed to the connection flange member (10) by means of the press fit and being fixed between the annular protrusion (16, 17) and the enlarged recess (13b, 14b). This eliminates the need for the straight part for sliding the split flange members in the direction of the pipe axis as in the conventional art, thereby allowing a reduction in the joint height.

Additionally, the pipe (11, 12) can be assembled with the connection flange member (10) by a simple method of mechanical press-fitting. Moreover, the connection flange member (10) may have a simple configuration such that the through hole (13, 14) having the enlarged recess (13b, 14b) is formed in a flat member. The connection flange member (10) can thus be integrally formed with efficiency by such a method as die-casting. It is therefore possible to reduce the fabrication costs of the pipe joint structure.

According to a second aspect of the present invention, in the pipe joint structure as set forth in the first aspect of the invention, the enlarged recess (13b, 14b) has a non-circular shape having a circumferential arrangement of portions approaching the inner diameter of the through hole (13, 14) and portions moving away therefrom. The annular protrusion (16, 17) has an outer diameter greater than an inner diameter of the enlarged recess (13b, 14b).

Consequently, at the time of press fitting and fixing, the outer periphery of the annular protrusion (16, 17) deforms to the non-circular walls of the enlarged recess (13b, 14b). The annular protrusion (16, 17) can thus be securely held and fixed by the enlarged recess (13b, 14b). The non-circular shape of the enlarged recess (13b, 14b) also improves the effect of preventing the pipe (11, 12) from rotation.

More specifically, according to a third aspect of the invention, the non-circular shape of the enlarged recess (13b, 14b) as set forth in the second aspect may be polygonal in shape.

According to a fourth aspect of the invention, the non-circular shape of the enlarged recess (13b, 14b) as set forth in the second aspect may be of a serrated shape.

According to a fifth aspect of the invention, in the pipe joint structure as set forth in any one of the first to fourth aspects, the pipe (11, 12) and the connection flange member (10) are made of aluminum alloys. Additionally, the aluminum alloy constituting the connection flange member (10) has a hardness higher than that of the pipe (11, 12).

Consequently, the use of the low-hardness aluminum alloy improves the formability of the pipe (11, 12) and permits smooth deformation of the annular protrusion (16, 17) at the time of the press fitting and fixing without problems. Moreover, since the connection flange member (10) is made of an aluminum alloy harder than that of the refrigerant pipe (11, 12), the connection flange member (10) can easily secure with the required strength, and the annular protrusion (16, 17), press-fitted and deformed, can be securely held and fixed by the enlarged recess (13b, 14b).

According to a sixth aspect of the invention, in the pipe joint structure as set forth in any one of the first to fifth aspects, the through hole (13, 14) and the enlarged recess (13b, 14b) are provided with an opening (13c, 14c) directly to an exterior of the connection flange member (10) in part in terms of the circumferential direction. It is therefore possible, as in an eleventh aspect to be described later, to form a bend (11a, 12a) in a region of the pipe (11, 12) next to the annular protrusion (16, 17) in advance before the pipe (11, 12) having this bend (11a, 12a) is inserted into the region of the through hole (13, 14) and the enlarged recess (13b, 14b) via the opening (13c, 14c). Thus, the pipe (11, 12) can be worked alone in advance, to have the bend (11a, 12a) next to the annular protrusion (16, 17), along with a further reduction in the joint height.

According to a seventh aspect of the invention, the connection flange member (10) as set forth in any one of the first to sixth aspects may be configured to hold a plurality of pipes (11, 12).

According to an eighth aspect of the invention, a method for fabricating a pipe joint structure has, but may not be limited to, the steps of forming a through hole (13, 14) in a connection flange member (10) so as to pierce the thickness of the flange member (10), forming an enlarged recess (13b, 14b) greater than an inner diameter of the through hole (13, 14) at one end of the through hole (13, 14), forming an annular protrusion (16, 17) protruding radially outward near an end of a pipe (11, 12) having an outer diameter capable of being inserted into the through hole (13, 14), and inserting the pipe (11, 12) into the through hole (13, 14), and then press-fitting and fixing the annular protrusion (16, 17) to the enlarged recess (13b, 14b). According to the eighth aspect, it is possible to provide a fabrication method for fabricating the pipe joint structure as set forth in the first aspect.

According to a ninth aspect of the invention, the method as set forth in the eighth aspect further comprises the step of forming an annular concave groove (20, 21) for accommodating an O-ring in a region of the pipe (11, 12) on the end side of the annular protrusion (16, 17). Here, the process of forming the annular concave groove (20, 21) and a process of finishing the annular protrusion (16, 17) to a predetermined outer diameter are performed at the same time by using a common roller means (26).

It was found from studies on prototypes conducted by the inventor that when the process of forming the annular concave groove (20, 21) is performed independently of the formation of the annular protrusion (16, 17), an offset in coaxiality occurs between the annular concave groove (20, 21) and the annular protrusion (16, 17). Then, as in the ninth aspect, the common roller means (26) is used to finish the outer diameter of the annular protrusion (16, 17) and form the annular concave groove (20, 21) at the same time, so that the annular concave groove (20, 21) can be formed with reference to the outer diameter of the annular protrusion (16, 17). As a result, the annular concave groove (20, 21) and the annular protrusion (16, 17) can be prevented from causing an offset in coaxiality. This can improve the assembly process between the pipe joint and the mating member by fitting.

According to a tenth aspect of the invention, if the through hole (13, 14) and the enlarged recess (13b, 14b) as set forth in the eighth or ninth aspect have a circumferentially closed configuration, then the straight part of the pipe (11, 12) is inserted into the through hole (13, 14) and the enlarged recess (13b, 14b), and the annular protrusion (16, 17) is pressed and fixed to the enlarged recess (13b, 14b) before a bend (11a, 12a) can be formed in the straight part.

According to an eleventh aspect of the invention, in the method as set forth in the eighth or ninth aspect, the through hole (13, 14) and the enlarged recess (13b, 14b) are shaped to have an opening (13c, 14c) directly exterior of the connection flange member (10) in part in terms of a circumferential direction. The pipe (11, 12) is previously provided with a bend (11a, 12a) in a region next to the annular protrusion (16, 17), and the pipe (11, 12) having the bend (11a, 12a) is inserted into the through hole (13, 14) and the enlarged recess (13b, 14b) via the opening (13c, 14c) before the annular protrusion (16, 17) and the enlarged recess (13b, 14b) are press-fitted and fixed.

Consequently, as in the sixth aspect described previously, the pipe (11, 12) can be worked alone in advance to have the bend (11a, 12a) next to the annular protrusion (16, 17), with a further reduction in the joint height.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a cross-sectional view of a larger diameter refrigerant pipe according to the first embodiment;

FIG. 5 is a cross-sectional view of the smaller diameter refrigerant pipe according to the first embodiment;

FIG. 6 is a cross-sectional view for explaining the method of assembling the connection flange member and the refrigerant pipes according to the first embodiment;

FIG. 11A is a cross-sectional view of the assembled pipe joint structure according to the second embodiment;

FIG. 11B is a side view of the assembled pipe joint structure according to the second embodiment;

DETAILED DESCRIPTION OF THE PREFERRED EMBODIMENTS

The following description of the preferred embodiments is merely exemplary in nature and is in no way intended to limit the invention, its application, or uses.

First Embodiment

FIGS. 1 to 5 show a first embodiment. The pipe joint structure of the first embodiment illustrates one intended to connect refrigerant piping of a vehicle air conditioning refrigeration system.

Figure 1:
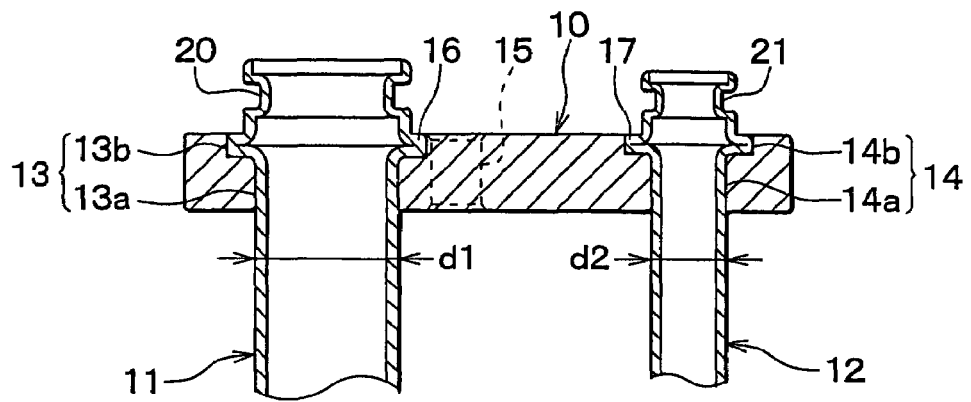
FIG. 1 is a cross-sectional view of a connection flange member showing a first embodiment of the present invention.
Figure 2:
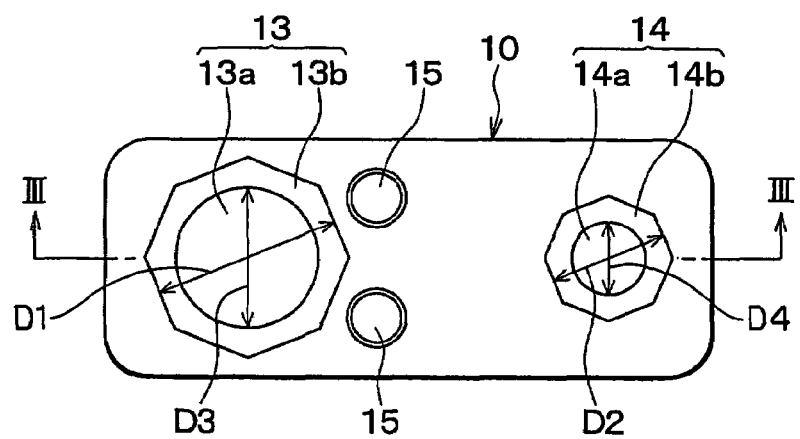
FIG. 2 is a plan view of a connection flange member according to the first embodiment.
Figure 3:
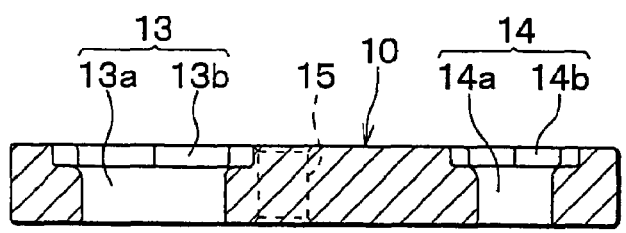
FIG. 3 is a cross-sectional view of FIG. 2.

A connection flange member 10 serves as a member for holding and fixing two refrigerant pipes 11, 12. The connection flange member 10 has the general shape of a rectangular plate as shown in FIGS. 2 and 3. Of the two refrigerant pipes 11, 12, one refrigerant pipe 11 having a large diameter d1 is a low-pressure refrigerant pipe of the refrigeration cycle, and more specifically a refrigerant pipe on the suction side of a compressor. The other refrigerant pipe 12 having a smaller diameter d2 is a high-pressure refrigerant pipe of the refrigeration cycle, and more specifically a high-pressure refrigerant pipe lying on the inlet side of an expansion valve.

The low-pressure (suction-side) refrigerant pipe 11 is connected at its top to the low-pressure refrigerant outlet of an expansion valve (decompressing means) which is not shown. The high-pressure refrigerant pipe 12 is connected to the high-pressure refrigerant inlet of the expansion valve. That is, the mating member of the pipe joint structure according to the first embodiment is an expansion valve.

The connection flange member 10 has two through holes 13, 14 which pierce through the thickness of the flange member 10. The two through holes 13, 14 are intended for the refrigerant pipes 11, 12 to be inserted through, respectively. One of the through holes, 13, lies in one end of the connection flange member 10 in the major-side direction. The other through hole 14 lies in the other end of the connection flange member 10 in the major-side direction.

Two bolt through holes 15 are formed in an intermediate region between the two through holes 13, 14. By means of bolts (not shown) inserted through the bolt through holes 15, the connection flange member 10 is clamped and fixed to a housing part of the expansion valve.

The two through holes 13, 14 are identical in shape except that they have different radial dimensions in accordance with the two refrigerant pipes 11, 12. Specifically, the through holes 13, 14 are composed of circular holes 13a, 14a and enlarged recesses 13b, 14b of a polygonal shape, or an octagonal shape in the shown example, which are formed at one end of the circular holes 13a, 14a, respectively. The inside flat-to-flat dimensions D1, D2 of the polygonal enlarged recesses 13b, 14b are rendered a predetermined amount greater than the inner diameters D3, D4 of the circular holes 13a, 14a. In addition, the inner diameter D3 of the circular hole 13a and the inner diameter D4 of the circular hole 14a are rendered a predetermined amount greater than the outer diameter d1 of the refrigerant pipe 11 and the outer diameter d2 of the refrigerant pipe 12, respectively.

The connection flange member 10 is made of metal, or aluminum in this embodiment. In order to reduce fabrication costs, the connection flange member 10 is integrally formed in the shape of FIGS. 2 and 3 by die-casting. The connection flange member 10 may be shaped by cutting, however, cutting may increase fabrication costs due to labor and finishing.

Next, description will be provided of the refrigerant pipes 11, 12. Again, the refrigerant pipes 11, 12 are identical in shape except that they have different radial dimensions. The refrigerant pipes 11, 12 are made of metal, or aluminum in this embodiment. For the aluminum material, the refrigerant pipes 11, 12 utilize an aluminum alloy that has a relatively low hardness, namely, A3003-O in view of its formability into a pipe shape. In contrast, the connection flange member 10 is made of an aluminum alloy having mechanical strength and hardness higher than A3003-O so as to provide strength as the member for press-fitting, fixing, and mounting the refrigerant pipes 11, 12 to be described later.

Protrusions 16, 17 are of an annular shape, protrude radially outward, and are integrally formed near the ends of the refrigerant pipes 11, 12 by bulging. The protrusions 16, 17 have outer diameters D5, D6 a predetermined amount greater than the flat-to-flat dimensions D1, D2 of the polygonal enlarged recesses 13b, 14b.

Annular concave grooves 20, 21 for accommodating O-rings 18, 19 (FIGS. 4, 5) are formed on the end sides of the protrusions 16, 17 by spinning (forming). This spinning (forming) will be detailed in conjunction with a sixth embodiment to be seen later.

Now, description will be given of the method of assembling the pipe joint structure according to the first embodiment. The connection flange member 10 is previously formed into the shape of FIGS. 2 and 3 by die-casting. The refrigerant pipes 11, 12 are previously formed into the shapes shown in FIGS. 4 and 5, i.e., the shapes of straight pipes having the annular protrusions 16, 17 and the annular concave grooves 20, 21 near the ends.

FIG. 6 shows a press-fitting system for press-fitting and fixing the connection flange member 10 and the refrigerant pipes 11, 12. The press fit system has a stationary fixture 22 and a moving fixture 23. The moving fixture 23 is arranged over the stationary fixture 22 and is capable of vertical movement. The stationary fixture 22 has recesses 22a, 22b for accommodating the vicinities of the concave grooves 20, 21 at the ends of the refrigerant pipes 11, 12. The moving fixture 23 has through holes 23a, 23b to make if possible for the straight parts of the refrigerant pipes 11, 12 to be inserted through.

Then, with the vicinities of the concave grooves 20, 21 at the pipe ends accommodated in the recesses 22a, 22b, side faces of the annular protrusions 16, 17 are put into contact with the top surface of the stationary fixture 22. Here, the refrigerant pipes 11, 12 are fit in the through holes 13, 14 in the connection flange member 10 and the through holes 23a, 23b in the moving fixture 23.

Next, a pressing unit (not shown) applies a pressing force to the moving fixture 23 as shown by the arrows A, whereby the moving fixture 23 and the connection flange member 10 are pressed down. Here, since the outer diameters D5, D6 of the annular protrusions 16, 17 are larger by a predetermined amount than the inside diameters D1, D2 of the polygonal enlarged recesses 13b, 14b, the outer peripheries of the annular protrusions 16, 17 are deformed to the polygonal shapes of the enlarged recesses 13b, 14b. That is, the connection flange member 10 deforms the outer peripheries of the annular protrusions 16, 17 while moving downward.

Consequently, the outer peripheries of the annular protrusions 16, 17 are tightly pressed against the polygonal inner walls of the enlarged recesses 13b, 14b. Here, the annular protrusions 16, 17 undergo restoring forces for restoring the polygonally-shaping deformations. These restoring forces firmly press the outer peripheries of the annular protrusions 16, 17 against the polygonal inner walls of the enlarged recesses 13b, 14b. As a result, the refrigerant pipes 11, 12 are firmly press-fitted and fixed to the connection flange member 10 in the regions of the annular protrusions 16, 17.

Incidentally, the differences between the outer diameters D5, D6 of the protrusions 16, 17 and the inside diameters D1, D2 of the polygonal enlarged recesses 13b, 14b are in the range of 0.2 and 1.2 mm or so.

FIG. 6 shows the state where the surface of the connection flange member 10 on the side of the enlarged recesses 13b, 14b comes into contact with the top surface of the stationary fixture 22 and the connection flange member 10 ends its downward movement, i.e., where the press fit and fixing of the refrigerant pipes 11, 12 is completed.

Figure 7:
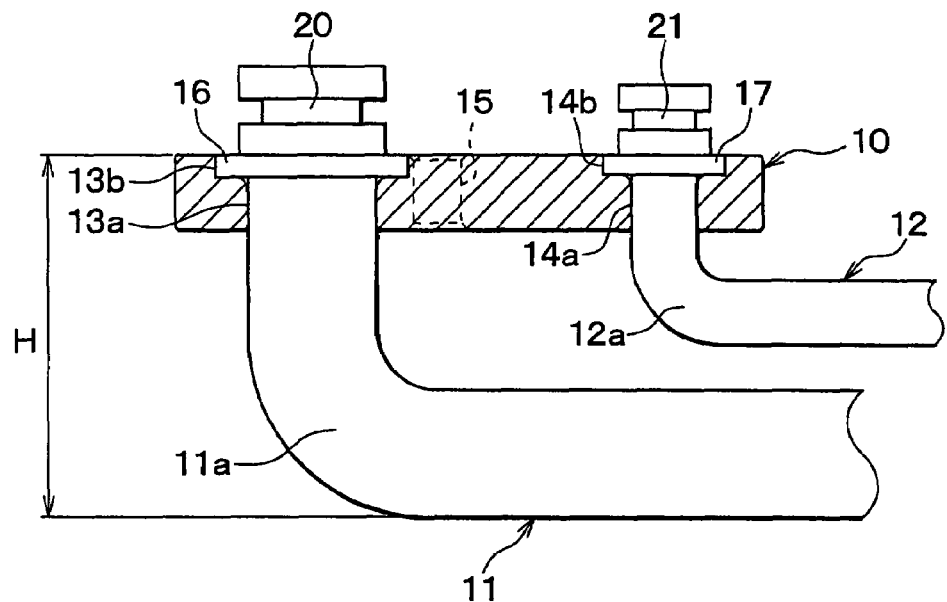
FIG. 7 is a cross-sectional view of the assembled pipe joint structure according to the first embodiment.

Next, the straight parts of the refrigerant pipes 11, 12 are subject to bending. This bending is intended to form 90 degree, rectangular bends 11a, 12a which are shown in FIG. 7. These bends 11a, 12a are required in order to meet the piping direction in a vehicle-mounted state.

To form the bends 11a, 12a, stationary fixtures (not shown) conforming to the shapes of the inner curves of the bends 11a, 12a are placed on the portions of the straight parts of the refrigerant pipes 11, 12 at a location corresponding to the inner curves. Meanwhile, moving fixtures (not shown) conforming to the shapes of the outer curves of the bends 11a, 12a are placed on the portions of the straight parts of the refrigerant pipes 11, 12 at a location corresponding to the outer curves. The moving fixtures are then pressed against the straight parts of the refrigerant pipes 11, 12 with a predetermined pressing force, whereby the rectangular bends 11a, 12a are formed.

Figure 22:
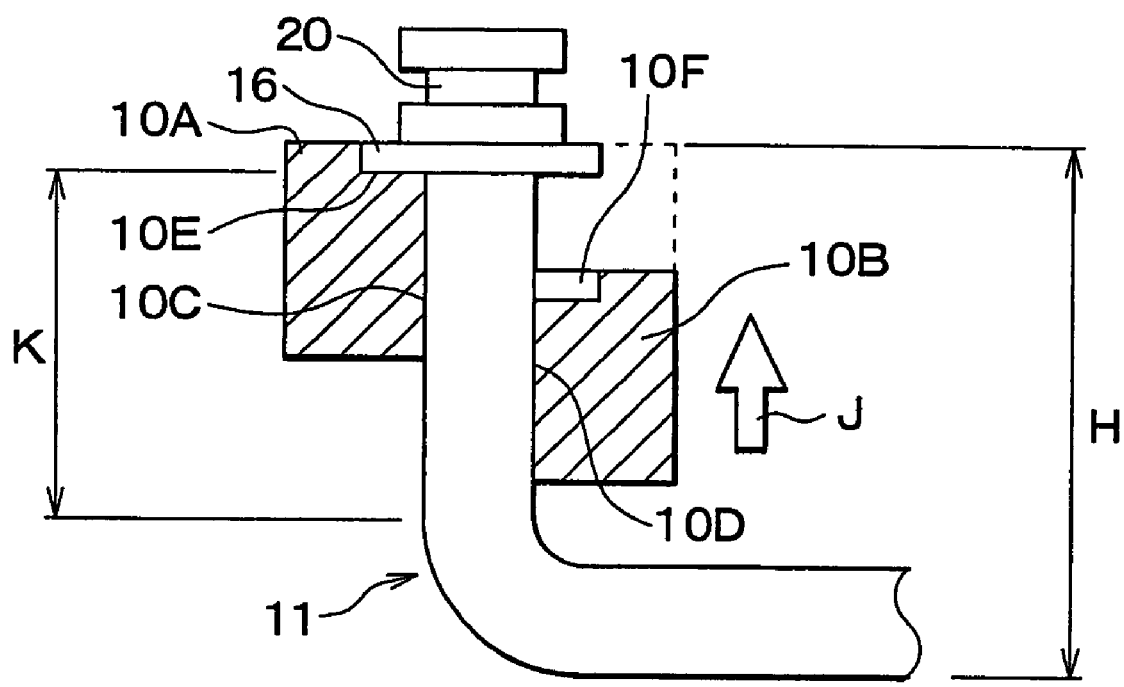
FIG. 22 is an explanatory diagram showing a conventional pipe joint structure.

According to the first embodiment, the connection flange member 10 and the refrigerant pipes 11, 12 are press-fitted and fixed to each other. This eliminates the need to slide two split flange members with respect to each other along the axial direction of the pipe 12 as shown by the arrow J as in the conventional art of FIG. 22. The first embodiment thus requires no straight part for sliding the split flange members along, so that the rectangular bends 11a, 12a can be formed in regions accordingly closer to the connection flange member 10 than in the conventional art. Consequently, as compared to the conventional art, the height H of the pipe joint can be reduced for improved vehicular mounting. Here, the height H of the pipe joint is the altitudal dimension between the side faces (top surfaces) of the annular protrusions 16, 17 of the refrigerant pipes 11, 12 and the bottom of the bend 11a of the large-diameter refrigerant pipe 11.

In the first embodiment, the through holes 13, 14 formed in the connection flange member 10 are shaped as the combinations of the circular holes 13a, 14a and the polygonal enlarged recesses 13b, 14b. This allows efficient, integral formation of the connection flange member 10 by die-casting as described above. Besides, the connection flange member 10 and the refrigerant pipes 11, 12 can be fixed by a simple mechanical assembly method of press-fitting, which requires no brazing. The pipe joint structure can thus be fabricated at a low cost.

In the first embodiment, the enlarged recesses 13b, 14b of the through holes 13, 14 in the connection flange member 10 are formed in polygonal shapes, and the outer peripheries of the annular protrusions 16, 17 of the refrigerant pipes 11, 12 are deformed to the polygonal enlarged recesses 13b, 14b. This makes it possible to reliably press-fit and fix the connection flange member 10 and the refrigerant pipes 11, 12. In particular, the connection flange member 10 is made of an aluminum alloy having a hardness and mechanical strength higher than the material of the refrigerant pipes 11, 12. It is therefore possible for the connection flange member 10 to be easily secured with the required strength, so that the press-fitted and deformed annular protrusions 16, 17 can be securely held and fixed by the enlarged recesses 13b, 14b.

The polygonal shapes of the enlarged recesses 13b, 14b can prevent the refrigerant pipes 11, 12 from any potential rotation. Since the enlarged recesses 13b, 14b to which the annular protrusions 16, 17 are press-fitted have the polygonal shapes, it is possible to form alternating press-deformed and less press-deformed portions in the circumferential directions of the outer peripheries of the annular protrusions 16, 17. Consequently, when compared to the case where entire circumferences are uniformly press-deformed from the beginning of the press fit (in the case of circular-to-circular press fit), the deformations of the outer peripheries of the annular protrusions 16, 17 can be smoothly extended in the circumferential directions as the connection flange member 10 increases according to the amount of downward movement (as the press fit proceeds).

Additionally, the refrigerant pipes 11, 12 are made of aluminum alloy A3003-O which is a material of relatively low hardness. Thus, in the step of press fitting and fixing, the outer peripheries of the annular protrusions 16, 17 can be deformed smoothly without any troubles. It is therefore possible to avoid the problem that the concave grooves 20, 21, for accommodating O-rings, deform during the step of press fitting and fixing.

Second Embodiment

Figure 8:
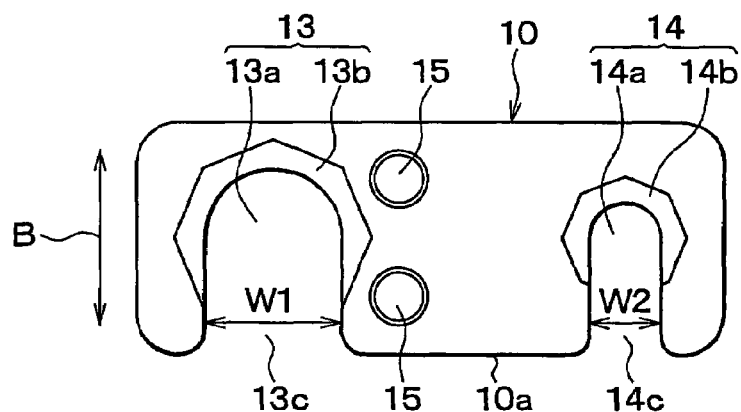
FIG. 8 is a plan view of the connection flange member according to a second embodiment.
Figure 9:
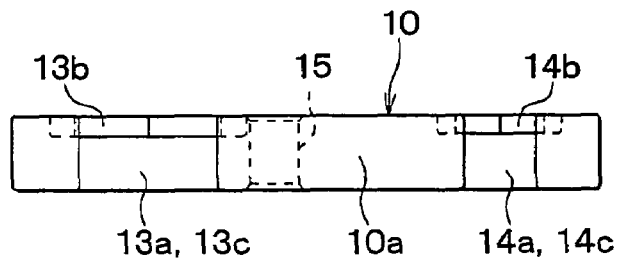
FIG. 9 is a front view of the connection flange member according to the second embodiment.
Figure 10:
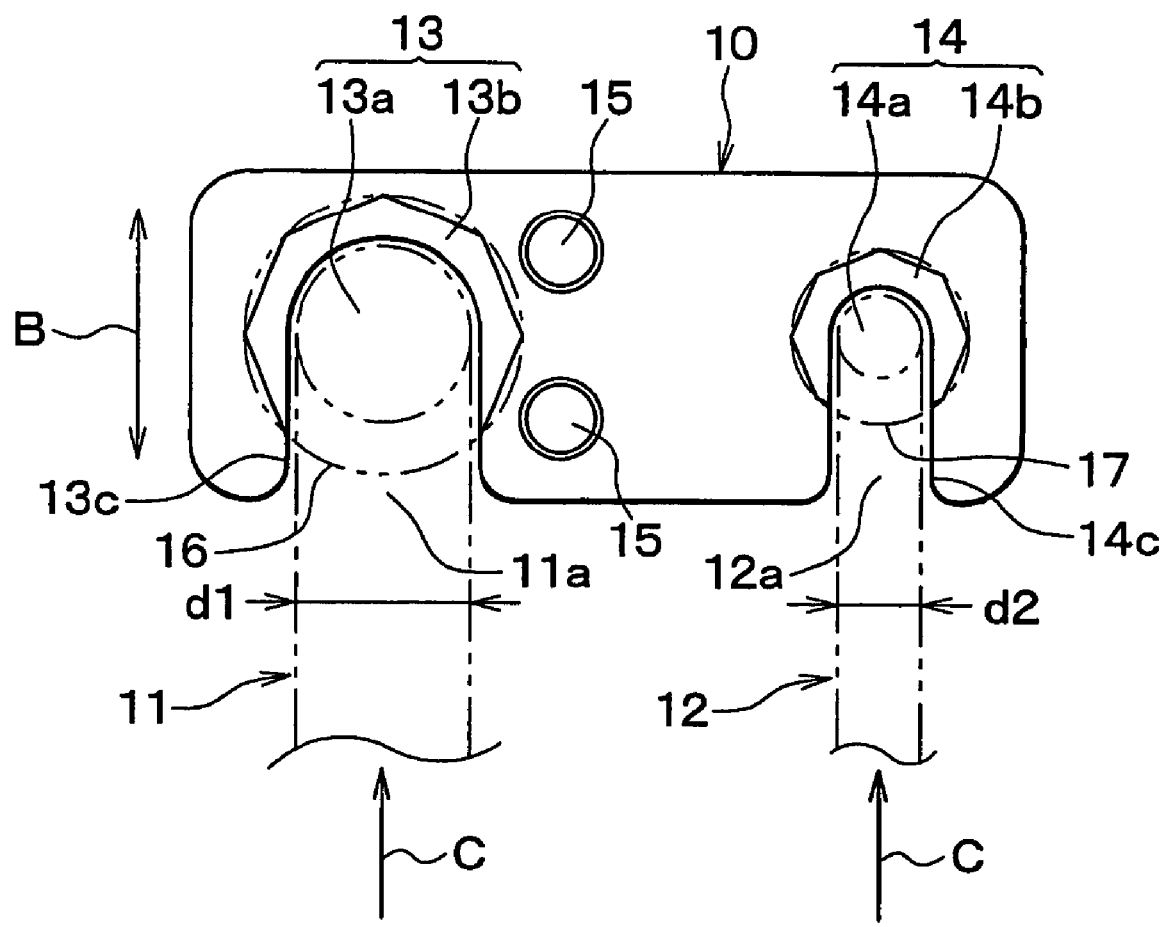
FIG. 10 is a plan view for explaining the method of assembling the connection flange member and refrigerant pipes according to the second embodiment.

In the first embodiment, the through holes 13, 14 in the connection flange member 10 have a circumferentially closed configuration such that they are not open to the side edges of the connection flange member 10. In a second embodiment, as shown in FIGS. 8 and 9, the through holes 13, 14 are modified into the circumferentially open configuration such that they are open to the exterior via openings 13c, 14c. FIG. 10 is an explanatory diagram showing an assembly method of the second embodiment. FIGS. 11A and 11B show the state after the assembly of the second embodiment.

Here, the direction of opening of the openings 13c, 14c is parallel to the minor-side direction B of the connection flange member 10. Through these openings 13c, 14c, the circular holes 13a, 14a and the enlarged recesses 13b, 14b of the through holes 13, 14 open partly, in terms of the circumferential direction, to a side edge 10a of the connection flange member 10 in the major-axis direction. Here, the widths W1, W2 of the openings 13c, 14c are the same as the diameters D3, D4 of hole portions 13a, 14a that correspond to the circular holes 13a, 14a of the first embodiment.

According to the second embodiment, the hole portions 13a, 14a and the enlarged recesses 13b, 14b open directly to an exterior of the connection flange member 10. Thus, as shown in FIGS. 11A and 11B, the refrigerant pipes 11, 12 may be provided with the bends 11a, 12a in advance before the refrigerant pipes 11, 12 and the connection flange member 10 are press-fitted and fixed.

Now, description of the assembly method according to the second embodiment will be provided. Initially, as shown in FIG. 10, the bends 11a, 12a of the refrigerant pipes 11, 12 and the straight parts leading to the bends 11a, 12a are arranged in parallel with the direction of opening of the openings 13c, 14c (the minor-side direction B of the connection flange member 10). Then, the annular protrusions 16, 17 of the refrigerant pipes 11, 12 are situated above the top surface of the connection flange member 10 so that the annular protrusions 16, 17 are prevented from interfering with the approaches of the openings 13c, 14c. In this situation, the bends 11a, 12a of the refrigerant pipes 11, 12, lying below the annular protrusions 16, 17, are inserted into the openings 13c, 14c as shown by the arrows C in FIG. 10.

Since the bends 11a, 12a, or the lower portions of the refrigerant pipes 11, 12, have outer diameters d1, d2 smaller than the widths W1, W2, the bends 11a, 12b can be easily inserted into the hole portions 13a, 14a through the openings 13c, 14c.

Subsequently, the connection flange member 10 and the refrigerant pipes 11, 12 are press-fitted and fixed by using a press fit system similar to that of FIG. 6. More specifically, side faces of the annular protrusions 16, 17 of the refrigerant pipes 11, 12 are supported in contact with the top surface of the stationary fixture.

Next, the moving fixture is arranged on the surface of the connection flange member 10 so as to avoid interference with the bends 11a, 12a and the straight parts of the refrigerant pipes 11, 12. In a press unit, a pressing force is applied to the moving fixture and the connection flange member 10, whereby the moving fixture and the connection flange member 10 are pressed downward toward the annular protrusions 16, 17 of the refrigerant pipes 11, 12.

Consequently, as in the first embodiment, the connection flange member 10 deforms the outer peripheries of the annular protrusions 16, 17 while moving downward. The outer peripheries of the annular protrusions 16, 17 are thus deformed to the polygonal shapes of the enlarged recesses 13b, 14b. As a result, the refrigerant pipes 11, 12 are firmly press-fitted and fixed to the connection flange member 10 in the regions of the annular protrusions 16, 17. FIGS. 11A and 11B show the state after the completion of the press fit.

According to the second embodiment, the refrigerant pipes 11, 12 can be worked alone and separately to have the bends 11a, 12a before the connection flange member 10 and the refrigerant pipes 11, 12 are press-fitted and fixed. The bends 11a, 12a can thus be formed in regions closer to the annular protrusions 16, 17 without being hindered by the connection flange member 10. It is therefore possible to reduce the height H of the pipe joint (FIGS. 11A and 11B) more than in the first embodiment.

In the second embodiment, as shown in FIGS. 10 to 11B, the bends 11a, 12a of the refrigerant pipes 11, 12 and the straight parts leading to the bends 11a, 12a are arranged in parallel with the direction of opening of the openings 13c, 14c (the minor-side direction B of the connection flange member 10). In this regard, this is a difference from the first embodiment.

Nevertheless, even in the second embodiment, the bends 11a, 12a and the straight parts of the refrigerant pipes 11, 12 are also capable of deformation such that they point in a direction oblique to the major-side direction of the connection flange member 10. For example, as shown in FIG. 10, the bends 11a, 12a and the straight parts of the refrigerant pipes 11, 12 are arranged in parallel with the direction of opening of the openings 13c, 14c (the minor-side direction B of the connection flange member 10). Then, the bends 11a, 12a and the straight parts of the refrigerant pipes 11, 12 are rotated by a predetermined angle (counterclockwise in FIG. 10) so that the direction of the bends 11a, 12a and the straight parts of the refrigerant pipes 11, 12 is oblique to the major-side direction of the connection flange member 10.

Subsequently, the refrigerant pipes 11, 12 and the connection flange member 10 can be press-fitted and fixed to achieve such deformation that the bends 11a, 12a and the straight parts of the refrigerant pipes 11, 12 point in a direction oblique to the major-side direction of the connection flange member 10.

Third Embodiment

Figure 12:
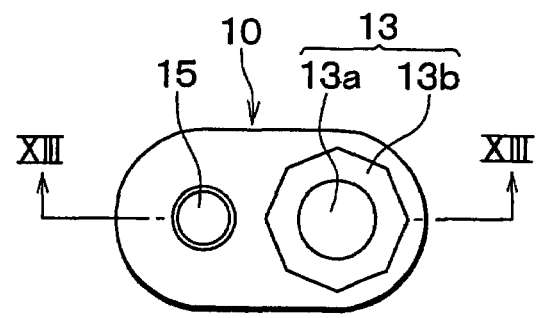
FIG. 12 is a plan view of the connection flange member according to a third embodiment.
Figure 13:
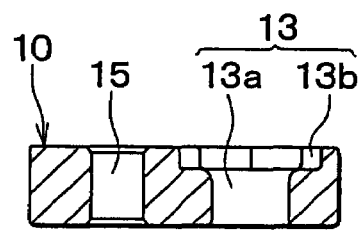
FIG. 13 is a cross-sectional view of FIG. 12.

The third embodiment is a modification of the first embodiment. As shown in FIGS. 12 and 13, the connection flange member 10 is provided with a single through hole 13. Only a single refrigerant pipe 11 is press-fitted and fixed to the polygonal enlarged recess 13b of the through hole 13.

Fourth Embodiment

Figure 14:
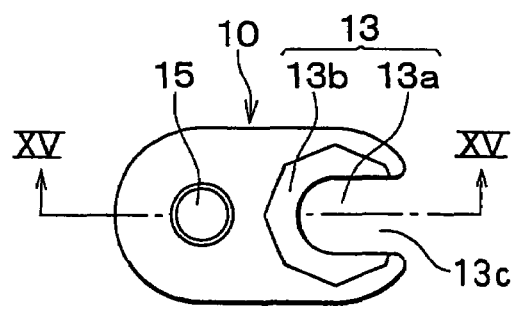
FIG. 14 is a plan view of the connection flange member according to a fourth embodiment.
Figure 15:
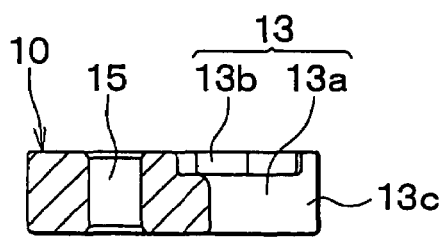
FIG. 15 is a cross-sectional view of FIG. 14.

The fourth embodiment is a modification of the second embodiment. As shown in FIGS. 14 and 15, the connection flange member 10 is provided with only a single through hole 13 having a circumferential configuration partly opened to the exterior via an opening 13c.

As can be seen from the third and fourth embodiments, the present invention is applicable even in the cases of press-fitting and fixing only a single refrigerant pipe 11 to the connection flange member 10.

Fifth Embodiment

Figure 16:
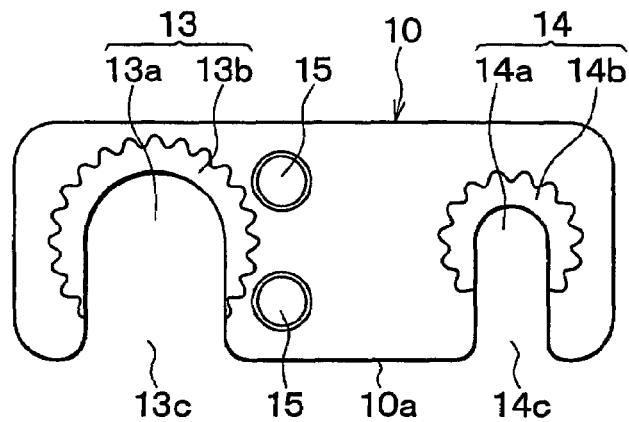
FIG. 16 is a plan view of the connection flange member according to a fifth embodiment.
Figure 17:
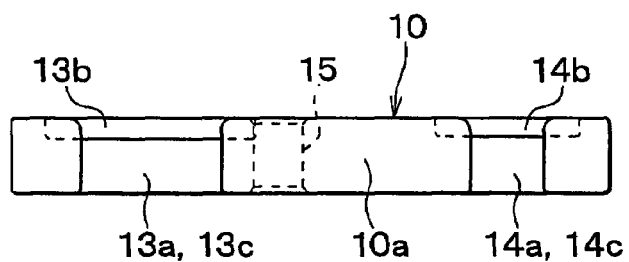
FIG. 17 is a front view of the connection flange member according to the fifth embodiment.

In the foregoing embodiments, the enlarged recesses 13b, 14b are formed in a polygonal shape. Nevertheless, as in a fifth embodiment, the enlarged recesses 13b, 14b may have a serrated shape as shown in FIGS. 16 and 17. Here, the serrated shape refers to the corrugated, pit-and-projection configuration extending in the circumferential direction. This is also similar to a gear tooth arrangement. The inside diameters of the serrations of the enlarged recesses 13b, 14b are rendered greater than the outer diameters of the annular protrusions 16, 17 of the refrigerant pipes 11, 12. Then, the connection flange member 10 and the refrigerant pipes 11, 12 can be press-fitted and fixed so that the fifth embodiment provides the same operation and effect as in the foregoing embodiments.

Note that FIGS. 16 and 17 show one corresponding to the connection flange member 10 of the second embodiment (FIGS. 8 and 9). Needless to say, the enlarged recesses 13b, 14b in the connection flange members 10 of the first, third, and fourth embodiments may also be given the serrated shape.

The enlarged recesses 13b, 14b according to the present invention may have either of the polygonal shape of the first to fourth embodiments and the serrated shape of the fifth embodiment. It is essential only that the enlarged, recessed 13b, 14b are given a non-circular shape of forming portions approaching the inner diameters of the holes portions 13a, 14a of the through holes 13, 14 and moving away therefrom repeatedly in the circumferential direction.

Sixth Embodiment

Figure 18:
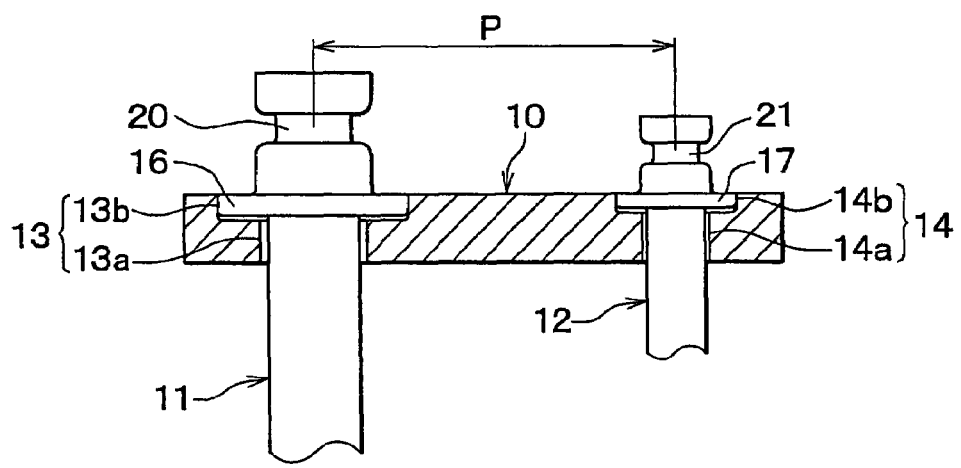
FIG. 18 is an explanatory diagram showing the pitch of the O-ring accommodating concave grooves of the pipe joint structure.

The sixth embodiment relates to a method of forming the annular protrusions 16, 17 and the annular concave grooves 20, 21 for accommodating O-rings, near the ends of the refrigerant pipes 11, 12. When the two refrigerant pipes 11, 12 are held and fixed by the connection flange member 10 as in the first, second, and fifth embodiments, an improvement to the precision of the interval between the concave grooves 20, 21 of the two refrigerant pipes 11, 12, i.e., the groove pitch P (see FIG. 18), is important in ensuring the assemblability between the pipe joint and the mating member. It is important in such an item as fitting an expansion valve.

Figure 19:
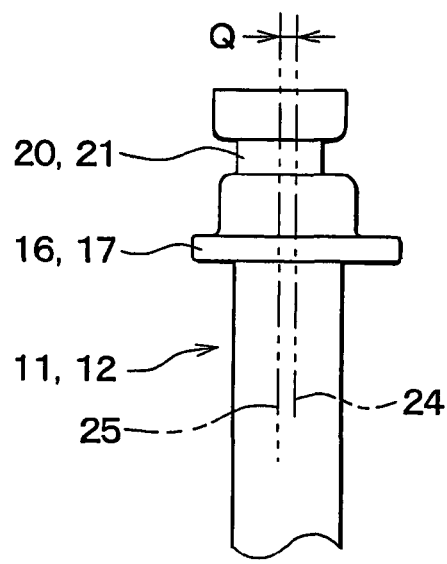
FIG. 19 is an explanatory diagram showing an offset in coaxiality between the annular protrusions and the O-ring accommodating concave grooves of the refrigerant pipes.

Nevertheless, the following was found from studies on actual prototypes of the pipe joint structure according to the present invention. That is, as shown in FIG. 19, the center position 24 between the annular protrusions 16, 17 and the center position 25 between the concave grooves 20, 21 can deviate from each other, thereby causing an offset Q in coaxiality between the annular protrusions 16, 17 and the concave grooves 20, 21 with a deterioration in the precision of the groove pitch P.

Figure 20:
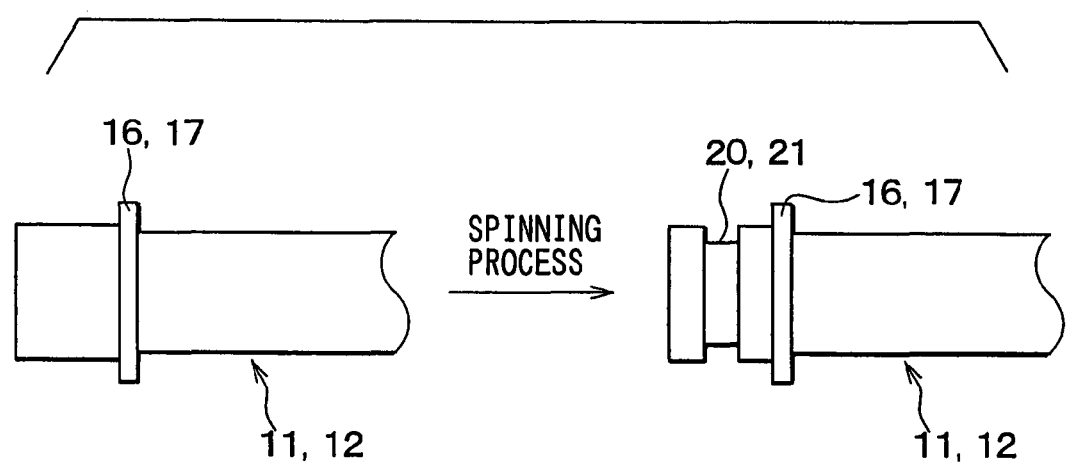
FIG. 20 is an explanatory diagram showing the method of forming the annular protrusions and the O-ring accommodating concave grooves of the refrigerant pipes.

The following explains the reason for this offset in coaxiality. As shown in FIG. 20, each refrigerant pipe 11, 12 is initially provided with the annular protrusion 16, 17 by bulging. Since this bulging is a working method in which part of the refrigerant pipe 11, 12 is bulged and deformed radially outward by an axial pressing force, the annular protrusion 16, 17 is high in coaxial precision. Subsequently, the region on the end side of the annular protrusion 16, 17 is subjected to spinning (forming), whereby the annular grooves 20, 21 are formed.

Figure 21:
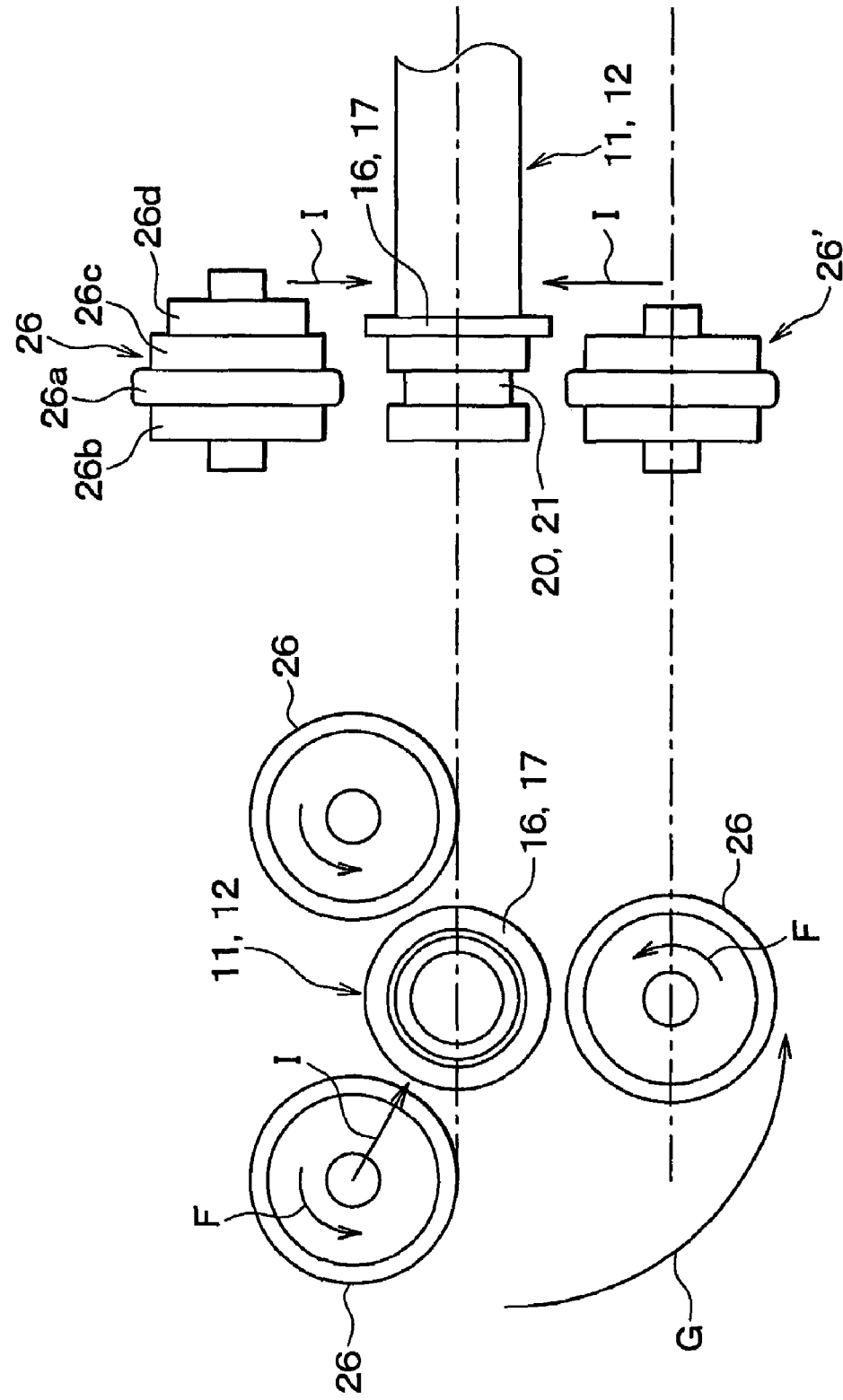
FIG. 21A is an explanatory diagram showing the method of forming the O-ring accommodating concave grooves according to a sixth embodiment.
FIG. 21B is an explanatory diagram showing the method of forming the O-ring accommodating concave grooves according to the sixth embodiment.

In this spinning (forming) process, as shown in FIGS. 21A and 21B, a plurality of spinning (forming) rollers 26 are individually rotated according to arrows F, with a revolution according to arrow G, around the refrigerant pipe 11, 12. The plurality of spinning (forming) rollers 26 are pressed against the surface of the end region of the refrigerant pipe 11, 12 as shown by the arrows I, so that the pipe surface is squeezed into the concave grooves 20, 21.

As above, the annular protrusions 16, 17 are formed by bulging, and then the concave grooves 20, 21 are formed independently by spinning (forming). This can cause a coaxiality offset of the concave grooves 20, 21 with respect to the annular protrusions 16, 17.

Then, in the sixth embodiment, the concave grooves 20, 21 are formed with respect to the outer peripheries of the annular protrusions 16, 17 so that the coaxiality offsets of the concave grooves 20, 21 disappear with an improvement in the precision of the groove pitch P.

The spinning (forming) roller 26 shown near the top in FIG. 21B is of the sixth embodiment and has a center roller part 26a with a large outer diameter about the axial center. This center roller part 26a forms the concave groove 20, 21 by squeezing. Side roller parts 26b, 26c for forming both sides of the concave grooves 20, 21 are arranged on both axial sides of the center roller part 26a. The spinning (forming) roller 26 also has an auxiliary roller part 26d for forming the outer periphery of the annular protrusion 16, 17.

The spinning (forming) roller 26' shown to the bottom in FIG. 21B is an ordinary roller (comparative example), having no auxiliary roller part 26d. With this lower spinning (forming) roller 26', the concave groove 20, 21 is thus exclusively formed by squeezing independently of the formation of the annular protrusion 16, 17.

In contrast, according to the spinning (forming) roller 26 of the sixth embodiment, a plurality of spinning (forming) rollers 26 are pressed against the surface of the end region of the refrigerant pipe 11, 12 to form the concave groove 20, 21 by squeezing. Here, the center roller parts 26a and the side roller parts 26b, 26c are pressed against the pipe surface while the auxiliary roller parts 26d are pressed against the outer periphery of the annular protrusion 16, 17.

The bulged annular protrusion 16, 17 can thus be finished to a predetermined outer diameter by means of the auxiliary roller parts 26d. Then, the concave groove 20, 21 is formed by squeezing using the center roller parts 26a and the side roller parts 26b, 26c while the auxiliary roller parts 26d are kept pressed in contact with the outer periphery of the annular protrusion 16, 17. Consequently, the annular protrusions 16, 17 and the concave grooves 20, 21 can be matched in coaxiality, thereby avoiding a coaxiality offset. It is therefore possible to improve the precision of the groove pitch P.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A pipe joint structure comprising:
    a connection flange member defining a through hole and an enlarged recess greater than an innermost diameter of said through hole, wherein said enlarged recess is located at one end of said through hole, the walls of said through hole and of said recess being substantially parallel to the central axis of said through hole; and
    a pipe having an outer diameter extending through said innermost diameter of said through hole and having a circular protrusion protruding radially outward from said pipe near an end of said pipe; wherein
    said enlarged recess has a serrated shape with a plurality of serrations and spaces disposed between adjacent serrations, an innermost diameter of said serrations being greater than said innermost diameter of said through hole; and
    said circular protrusion is press-fitted and fixed radially and axially to said enlarged recess such that an outer periphery of said circular protrusion is deformed into the serrated shape of said enlarged recess such that portions of the deformed circular protrusion are pushed into the spaces between the adjacent serrations and fixed in close relation against the serrations due to the deformation caused by the press-fitting fixation.

2. The pipe joint structure according to claim 1, wherein:
    said pipe and said connection flange member are made of an aluminum alloy; and
    the aluminum alloy constituting said connection flange member has a hardness higher than that of said pipe.

3. The pipe joint structure according to claim 1, wherein said through hole and said enlarged recess are provided with an opening directly to an exterior of said connection flange member in part of a circumferential direction.

4. The pipe joint structure according to claim 3, wherein said connection flange member is configured to hold a plurality of pipes.

5. The pipe joint structure according to claim 3, wherein:
    the opening is defined at least by two opposed flat portions; and
    the diameter of the circular protrusion is greater than a distance between the two opposed flat portions defining the opening.

* * * * *